(12) United States Patent
Mulkey

(10) Patent No.: US 6,741,167 B1
(45) Date of Patent: May 25, 2004

(54) TRAILER THEFT ALARM

(76) Inventor: Lynn Mulkey, 5229 Brandonway Ct., Dublin, OH (US) 43017

( * ) Notice: Subject to any disclaimer, the term of this patent is extended or adjusted under 35 U.S.C. 154(b) by 718 days.

(21) Appl. No.: 09/691,986

(22) Filed: Oct. 19, 2000

(51) Int. Cl.$^7$ .............................................. G08B 21/00
(52) U.S. Cl. ................ 340/431; 340/568.1; 340/426.1; 340/426.33
(58) Field of Search ............................. 340/431, 568.1, 340/568.2, 568.4, 425.5, 426.1, 426.33, 692

(56) References Cited

U.S. PATENT DOCUMENTS

| | | | | |
|---|---|---|---|---|
| 3,972,039 A | * | 7/1976 | Marshall | 340/508 |
| 4,040,008 A | * | 8/1977 | Sanabria | 340/429 |
| 4,622,833 A | * | 11/1986 | Shepherd | 70/226 |
| 4,833,442 A | * | 5/1989 | Von Heck | 340/427 |
| 5,677,668 A | * | 10/1997 | Winner, Jr. | 340/438 |
| 6,133,831 A | * | 10/2000 | Kyles | 340/571 |
| 6,140,923 A | * | 10/2000 | Lam | 340/568.7 |

* cited by examiner

*Primary Examiner*—Daniel J. Wu
*Assistant Examiner*—Phung T Nguyen
(74) *Attorney, Agent, or Firm*—Thomas S. Baker, Jr.

(57) ABSTRACT

A trailer vehicle is provided with an audible alarm that is sounded when a removable activator pin in a electrical circuit is withdrawn as a consequence of initial rotation of a trailer vehicle roadway wheel during movement of the trailer vehicle from a parked condition.

3 Claims, 1 Drawing Sheet

TRAILER THEFT ALARM

CROSS-REFERENCES

None.

FIELD OF THE INVENTION

This invention relates generally to trailer vehicles, and particularly concerns a theft alarm that may be readily manufactured and attached to a parked trailer vehicle and that efficiently acts as an audible deterrent to theft of the parked vehicle.

BACKGROUND OF THE INVENTION

It has been observed that theft of parked trailers is occurring with increased frequency in many different business and other locations, and even often in situations where there are individuals nearby who could initiate preventative or apprehending measures if they were aware that theft activity was in progress. The preventative action can be particularly effective if the nearby individuals are alerted to the theft activity, as by an audible alarm, at the time the first overt steps of a theft action are initiated.

Accordingly, the principal objects oft he present invention are to provide an audible-type theft alarm that may be readily and inconspicuously attached to a parked trailer vehicle, that functions to emit a loud audible sound whenever the trailer is subsequently moved with the theft alarm in place, and that may be readily deactivated by a person having knowledge of the location of the trailer theft alarm installation.

Other objects and advantages of the present invention will become apparent from a consideration of the description details, drawings, and claims which follow.

SUMMARY OF THE INVENTION

The trailer theft alarm of the present invention is comprised in-part of a conventional personal alarm device having a self-contained battery power source, an audible frequency amplifier/speaker powered by the battery power source, and an internal normally-opened switch which interconnects the battery power source to the amplifier/speaker and which is activated (closed) by withdrawal of an included and co-operating removable activator pin. The invention trailer theft alarm is also comprised of a fastener means for removably mounting the personal alarm device on the parked trailer separate from the trailer wheels, an anchor fitting removably secured to the parked trailer wheel in an inconspicuous location, and a fixed-length cable attached at one end to the wheel anchor fitting and at its other end to the personal alarm device interconnect switch removable activator pin.

To deter trailer theft the trailer theft alarm is operatively secured to the vehicle trailer after the trailer has been parked. Subsequent movement of the trailer with the trailer theft alarm properly installed results in trailer wheel rotation, withdrawal of the removable activating pin from co-operation with the personal alarm device interconnect switch, and loud audible sounding of the personal alarm device amplifier/speaker.

Figure 1:
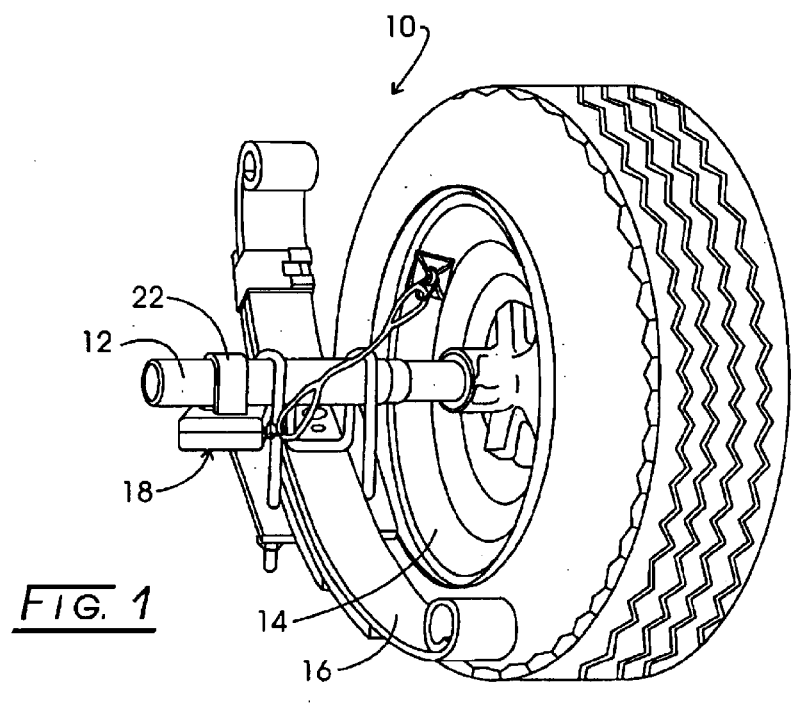
FIG. 1 schematically, and in perspective, illustrates the axle and wheel portion of a vehicle trailer with a preferred embodiment of the trailer theft alarm of the present invention properly installed.
Figure 2:
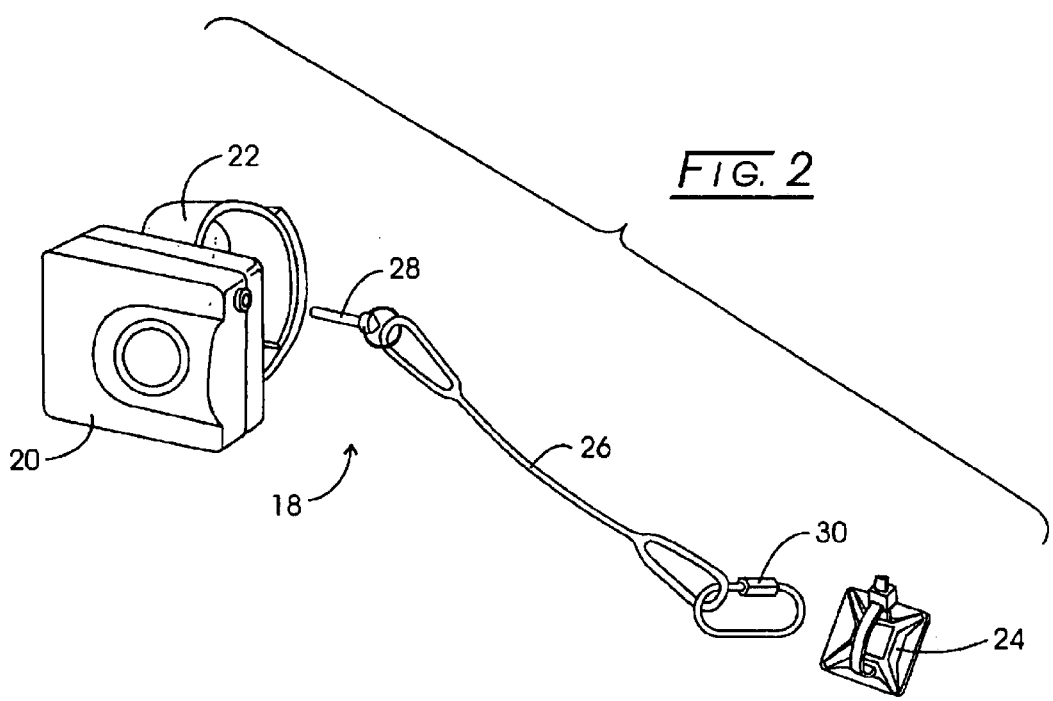
FIG. 2 is an exploded perspective view of the FIG. 1 trailer theft alarm.

DETAILED DESCRIPTION:

FIG. 1 illustrates a portion of a typical vehicle trailer 10 that includes an axle component 12, a wheel 14 conventionally mounted on the axle, and a multi-leaf spring 16 which is connected to the trailer body (not shown) and serves to connect axle 12 to the trailer body in the usual manner. The trailer theft alarm 18 of the present invention comprises a commercially-available personal alarm device 20 (see FIG. 2) that is preferably removably connected to vehicle trailer 10 at a location such as axle 12 using attached hook and loop (Velcro™) strap 22, a staple-like anchor fitting 24 which is readily attached to the inner surface of vehicle trailer wheel 14 using a pressure-sensitive adhesive, and a tether cable component 26 which is connected at one of its looped ends to the installed removable activator pin component 28 of audible personal alarm device 20 and at the other of its looped ends to anchor fitting 24.

As indicated above, personal alarm device 20 is a commercially-available item having a self-contained battery power source, an audible frequency amplifier/speaker powered by the battery power source, and an internal normally-opened switch which interconnects the battery power source to the amplifier/speaker and which is activated (closed) by withdrawal of an included and co-operating removable activator pin (28). One such device is available in retail outlets under the trade-name designation "CE Personal Alarm".

To facilitate temporary disablement of trailer theft alarm 18, as when movement of vehicle trailer 10 is authorized or desired, I additionally prefer that the looped end of interconnect cable element 26 that is attached to anchor fitting 24 be provided with manual release loop element 30 that when removed from co-operation with anchor fitting 24 effectively disables trailer theft alarm 18 from sounding an audible alert when the trailer is subject to unauthorized movement.

I claim as my invention:

1. In combination with a trailer vehicle having a trailer axle and a roadway wheel mounted upon the trailer axle, a theft alarm comprising:

an audible alarm element having an electrical energy source, an audio amplifier/speaker powered by the electrical energy source, and an alarm switch with removable alarm switch activator pin that interconnects the electrical energy source and the audio amplifier/speaker whereby that the alarm emits an audible alarm signal when the alarm switch removable activator pin is withdrawn from co-operation with the alarm switch;

first fastener mean removably securing said audible alarm element to the trailer vehicle axle;

an anchor fitting;

second fastener means removably securing said anchor fitting to an inner surface of the trailer vehicle roadway wheel; and flexible cable means connected to said anchor fitting and to the removable activator pin of said audible alarm element, said flexible cable means having a length sufficient to cause said audible alarm element alarm switch removable activator pin to be withdrawn from co-operation with said audible alarm element alarm switch when the trailer vehicle roadway wheel is rotated during movement of the trailer vehicle.

2. The invention combination defined by claim 1, and wherein said first fastener means is a hook and loop-type fastener.

3. The invention combination defined by claim 1 and further comprising a manual release element, said manual release element connecting said flexible cable means to said anchor fitting.

* * * * *